(12) United States Patent
Fortino

(10) Patent No.: US 12,229,628 B2
(45) Date of Patent: *Feb. 18, 2025

(54) CONTROL OF CAPTURE AND DECODING OF ENCODED DATA MARKINGS VIA TOUCHSCREEN AND HAPTIC FEEDBACK

(71) Applicant: Datalogic I.P. Tech S.R.L., Lippo di Calderara di Reno (IT)

(72) Inventor: Dario Fortino, Bologna (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,701

(22) Filed: Jun. 27, 2023

(65) Prior Publication Data

US 2023/0385575 A1 Nov. 30, 2023

Related U.S. Application Data

(63) Continuation of application No. 17/825,403, filed on May 26, 2022, now Pat. No. 11,699,050.

(51) Int. Cl.
| | |
|---|---|
| *G06K 7/10* | (2006.01) |
| *G06F 3/01* | (2006.01) |
| *G06F 3/0488* | (2022.01) |
| *G06K 7/14* | (2006.01) |

(52) U.S. Cl.
CPC ......... *G06K 7/10881* (2013.01); *G06F 3/016* (2013.01); *G06F 3/0488* (2013.01); *G06K 7/1413* (2013.01)

(58) Field of Classification Search
CPC ............. G06K 7/10881; G06K 7/1412; G06K 7/1413; G06F 3/016; G06F 3/0488
USPC .......................... 235/462.45, 462.43, 472.01
See application file for complete search history.

(56) References Cited

U.S. PATENT DOCUMENTS

| | | | |
|---|---|---|---|
| 9,892,876 B2 | 2/2018 | Bandringa | |
| 10,222,979 B2 | 3/2019 | Chiarini | |
| 10,671,277 B2 | 6/2020 | Ballesteros et al. | |
| 11,003,874 B1 | 5/2021 | Astvatsaturov | |
| 2018/0157045 A1* | 6/2018 | Davami | G02B 27/0172 |

* cited by examiner

*Primary Examiner* — Edwyn Labaze
(74) *Attorney, Agent, or Firm* — The Juhasz Law Firm

(57) ABSTRACT

A decoding device includes an aiming component and a scanning component of a scanning engine; a display component and tactile components of a touch screen; and a processor configured to operate the display component to display an initial icon, monitor the tactile components to detect a commencement of a digit tip press on the touch screen at the initial icon, and in response to the digit tip press having a pressure between predetermined lower and higher pressure levels, perform operations including: operate the aiming component to project the visual guide; monitor the tactile components to detect a pressure increase of the digit tip press to higher than the predetermined higher pressure level; and in response to the increase in pressure, operate the scanning component to attempt to scan an encoded data marking, and operate the tactile components to provide a haptic indication of the attempt to the digit tip.

20 Claims, 10 Drawing Sheets

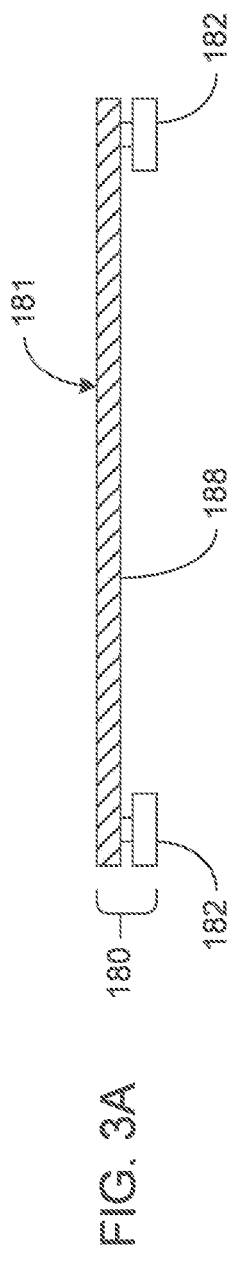
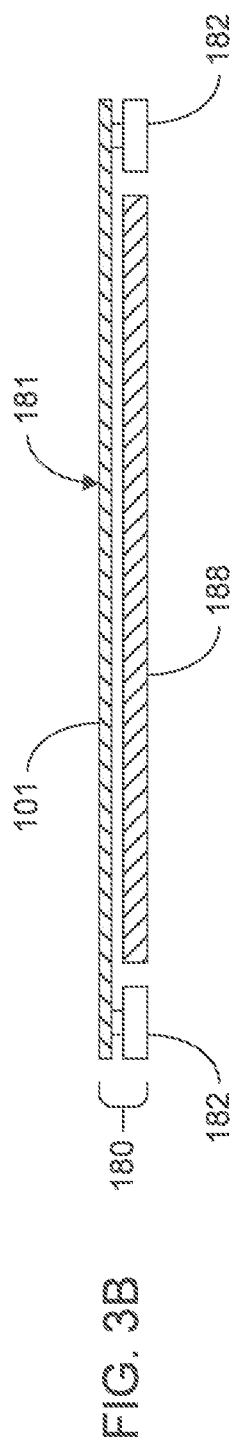

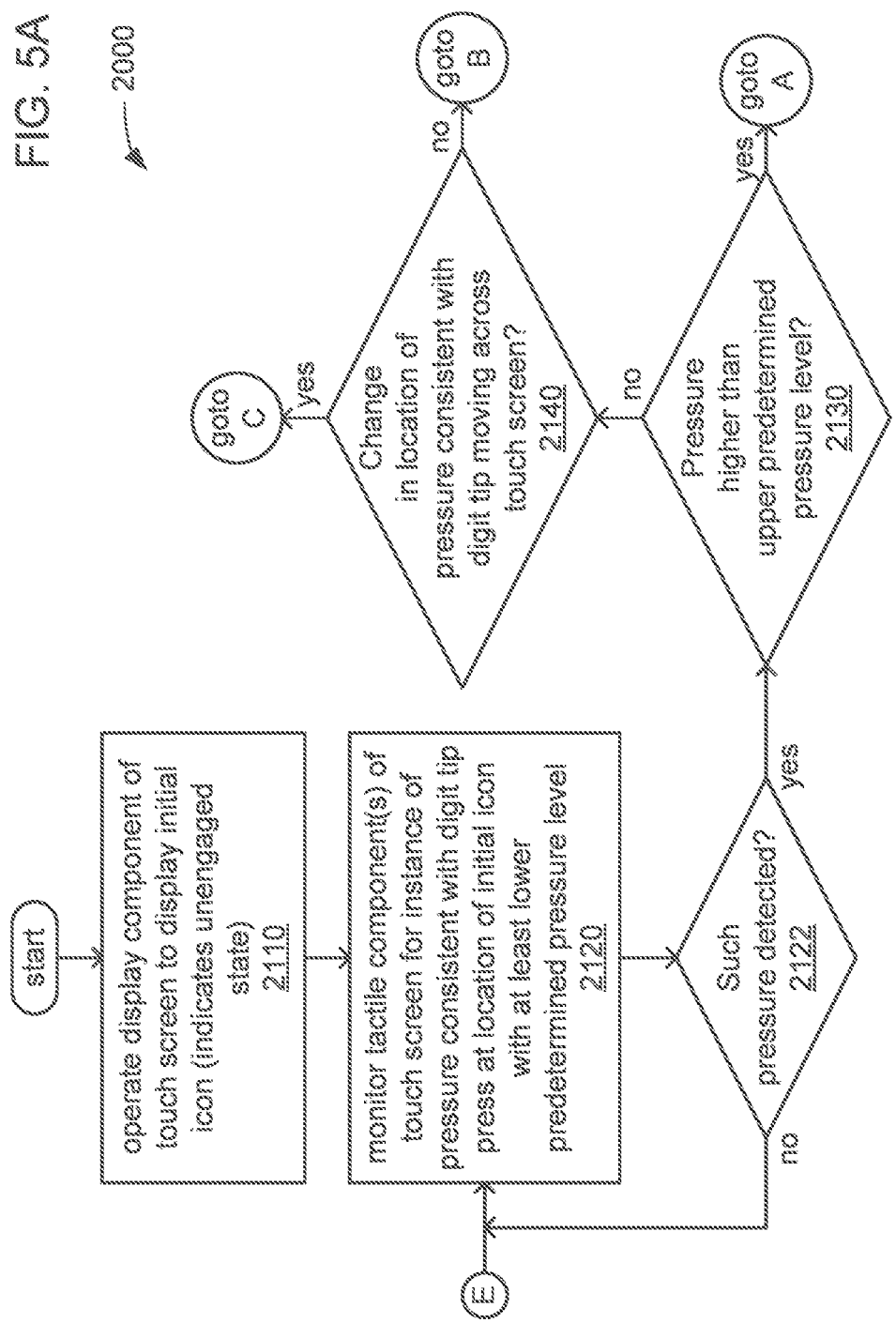

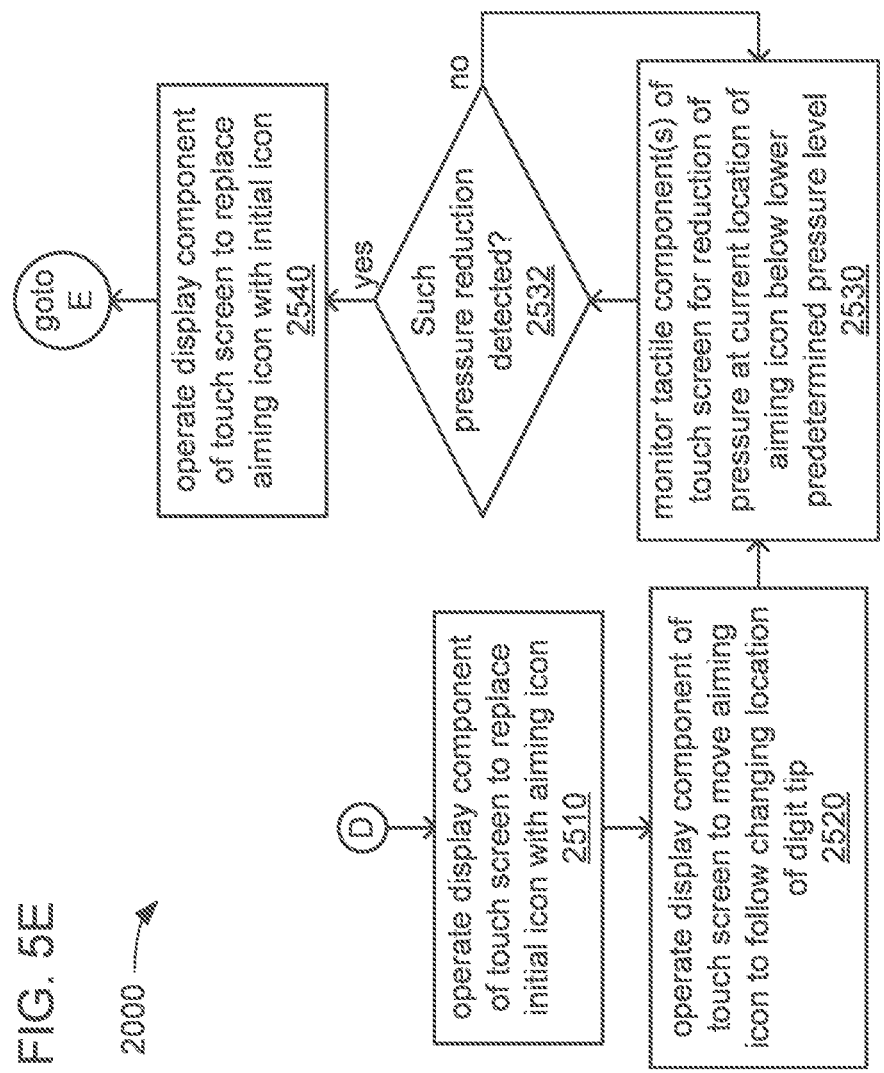

CONTROL OF CAPTURE AND DECODING OF ENCODED DATA MARKINGS VIA TOUCHSCREEN AND HAPTIC FEEDBACK

CLAIM TO PRIORITY

This application claims priority to and the benefit of the following pending application, Ser. No. 17/825,403, filed May 26, 2022, entitled, "CONTROL OF CAPTURE AND DECODING OF ENCODED DATA MARKINGS VIA TOUCHSCREEN AND HAPTIC FEEDBACK;" the contents of the pending application is hereby incorporated by reference in its entirety.

BACKGROUND

1. Technical Field

The present disclosure relates to increasing efficiency and ease of use of machine vision systems.

2. Description of the Related Art

The application of encoded data markings that encode data (e.g., indicia such as barcodes, digital watermarks and/or human-readable text) to a surface of an object for subsequent capture and decoding to retrieve data encoded therein is well known. Also well known is the use of a scanning device incorporating a scanning engine to directly capture an image of such a surface in an effort to capture an image of one or more encoded data markings for decoding. Further well known is the use of such markings, together with such capturing and decoding thereof, in organizing such activities as the transport, storage and inventorying of objects in various industries.

Such a scanning device may be a portable scanning device maintained at a location at which an object bearing one or more of such encoded data markings may be stored, through which such an object may be transported, and/or at which such an object may be offered for lease and/or sale. By way of example, such a scanning device may be carried by personnel at a warehouse to enable the capture of one or more encoded data markings carried on a surface of an object (e.g., a box, a crate, a palletized load, etc.) as the object is transported into the warehouse, is stored within the portion of the warehouse, is retrieved from such storage and/or is transported out of the warehouse. Also by way of example, such a scanning device may be carried by personnel at a store, a performance venue or other place of business to enable the capture of one or more encoded data markings carried on a surface of an object as the object is transported thereto or therefrom, and/or is presented as part of an admission procedure (e.g., a package of a product that is being rented or purchased thereat, a package that is being delivered or is being picked up by a courier, a ticket that is being presented for admission to attend an event thereat, a ticket that is being presented to board transportation to another location, etc.).

Also known is the inclusion of a mechanically depressible button as part of the user interface (UI) of such a scanning device to serve as a manually operable trigger for causing the capture and decoding of encoded data markings. More specifically, it is known to provide such a button that is mechanically depressible to a first degree to cause entry of the scanning device into an aiming mode, and that is mechanically depressible to a second degree to cause entry of the scanning device into a scanning mode. An operator of the scanning device may operate such a button with the tip of a single digit (e.g., either one of the fingers of a hand, or the thumb of a hand) to apply an initial level of pressure thereto to cause the button to be depressed to the first (lesser) degree to cause entry into the aiming mode, and then to subsequently apply a greater level of pressure thereto to cause the button to be depressed to the second (greater) degree to cause a transition from the aiming mode and into the scanning mode.

During the aiming mode, any of a variety of aiming features of the scanning device may be activated to assist the operator in aiming the scanning engine at a particular encoded data marking that is to be captured and decoded. Such aiming features may include a visual aiming guide that is projected onto the surface that carries the particular encoded data marking to provide visual guidance to the operator in maneuvering the scanning device to cause the particular encoded data marking to be positioned within a particular location within the field of view (FOV) of the scanning engine that enables the particular encoded data marking to be captured. The operator may maintain the first level of pressure for multiple seconds to keep the scanning device until the operator has successfully maneuvered the scanning device to put the particular encoded data marking within that particular location within the FOV, whereupon the operator may then increase level of pressure applied to the button from the first level to the second level to cause the transition into the scanning mode.

During the scanning mode, an attempt is made to capture and decode the particular encoded data marking. Presuming that the attempt is successful, it is known to provide some form of feedback to the operator that is indicative of such success, such as an audible indication (e.g., a single beep sound) and/or a visual indication.

It is also well known to fabricate the casing of such a scanning device to have a pistol-like shape and size in which such a mechanically depressible button is incorporated into a distinct hand grip portion of the casing at a location that is similar to the "trigger" of such a pistol-like shape. Additionally, the scanning engine may be positioned within the casing to cause its FOV to extend outwardly therefrom in a manner reminiscent of the direction in which a bullet would travel upon being fired from a pistol. In this way, an operator may carry and operate the scanning device in a manner reminiscent of a pistol such that the operator "points" the scanning device at an encoded data marking in a manner similar to how a pistol might be pointed at the encoded data marking to "shoot" at it. The operator may then operate the mechanically depressible button in the trigger-like manner to cause the scanning device to enter the aiming mode, and then the scanning mode.

Unfortunately, such a pistol-like shape is increasingly perceived by operators of scanning devices as being too bulky, and there is an increasing desire to give scanning devices a slimmer shape more akin to smart phones and/or tablet computers. As a result, there is an increasing desire to do away, altogether, with incorporating such a mechanically depressible button in favor of using a touch screen. Thus, there is a need to provide a suitable UI for causing such staged entry into the aiming mode and the scanning mode that employs a touch screen in place of a mechanically depressible button.

BRIEF SUMMARY

Technologies are described for making more efficient use of processing resources in identifying and quantifying differing types of barcode read failure in an automated barcode reading system.

A decoding device includes: a scanning engine comprising an aiming component configured to project a visual guide to assist in aiming the scanning engine at an encoded data marking on a surface of an object, and a scanning component configured to scan an encoded data marking within a field of view (FOV) of the scanning engine; a touch screen display comprising a display component configured to visually present visual indications, and at least one tactile component configured to accept touch input and to provide haptic indications to digits of a hand; and a processor communicatively coupled to the touch screen display and the scanning engine. The processor is configured to perform operations including: operate the display component to display an initial icon on the touch screen display; and monitor the at least one tactile component to detect a commencement of pressing of a tip of a digit of a hand on the touch screen display at the initial icon. The processor is also configured to, in response to the detection of commencement of the digit tip press, and in response to the digit tip press commencing with a pressure greater than a predetermined lower pressure level and less than a predetermined higher pressure level, perform operations including: operate the aiming component to project the visual guide; monitor the at least one tactile component to detect an increase in the pressure of the digit tip press to a level higher than the predetermined higher pressure level; and in response to the detection of the increase in the pressure of the digit tip press to a level higher than the predetermined higher pressure level, operate the scanning component to attempt to scan the encoded data marking within the FOV and operate the at least one tactile component to provide, to the tip of the digit, a haptic indication of the attempt to scan the encoded data marking.

A method includes: operating, by a processor of a decoding device, a display component of a touch screen display of the decoding device to display an initial icon on the touch screen display; and monitoring, by the processor, at least one tactile component of the touch screen display to detect a commencement of pressing of a tip of a digit of a hand on the touch screen display at the initial icon. The method also includes, in response to the detection of the commencement of the digit tip press, and in response to the digit tip press commencing with a pressure greater than a predetermined lower pressure level and less than a predetermined higher pressure level, performing operations including: operating, by the processor, an aiming component of a scanning engine of the decoding device to project a visual guide to assist in aiming the scanning engine at an encoded data marking on a surface of an object; monitoring, by the processor, the at least one tactile component to detect an increase in the pressure of the digit tip press to a level higher than the predetermined higher pressure level; and in response to the detection of the increase in the pressure of the digit tip press to a level higher than the predetermined higher pressure level, operating, by the processor, a scanning component of the scanning engine to attempt to scan the encoded data marking within a field of view (FOV) of the scanning engine, and operating, by the processor, the at least one tactile component to provide, to the tip of the digit, a haptic indication of the attempt to scan the encoded data marking.

BRIEF DESCRIPTION OF THE DRAWINGS

FIGS. 3A and 3B provide cross-sectional views of differing embodiments of a touch screen of the scanning device of FIG. 1.

FIGS. 5A, 5B, 5C, 5D and 5E provide a flowchart of operation of the scanning device of FIG. 1.

DETAILED DESCRIPTION

Figure 1:
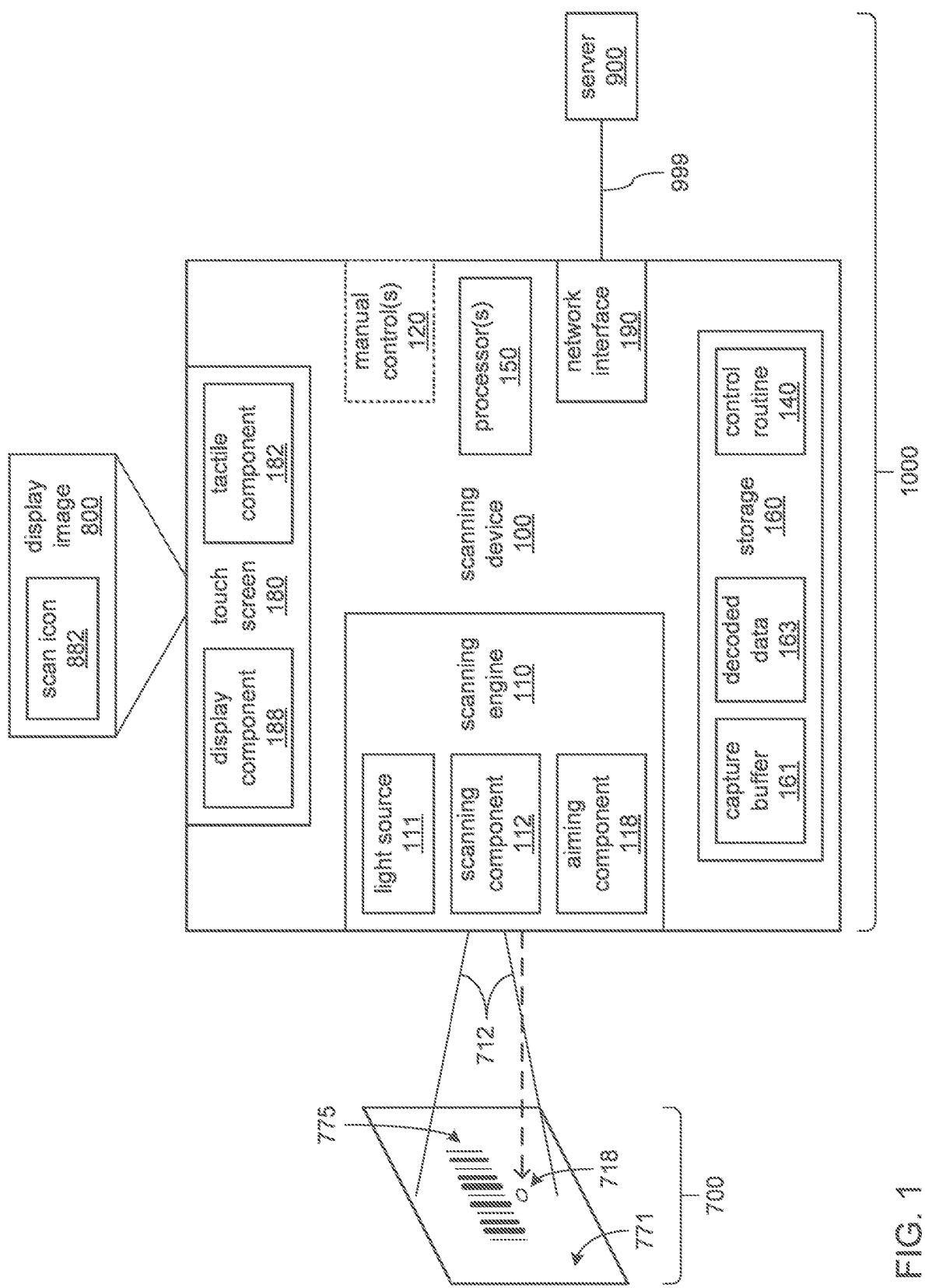
FIG. 1 is a block diagram of hardware components of the portable electronic device capable of scanning and decoding encoded data markings.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a apparatus implementing a method for providing a suitable UI for enabling staged operation of a portable scanning device in aiming and scanning modes.

A decoding device includes: a scanning engine comprising an aiming component configured to project a visual guide to assist in aiming the scanning engine at an encoded data marking on a surface of an object, and a scanning component configured to scan an encoded data marking within a field of view (FOV) of the scanning engine; a touch screen display comprising a display component configured to visually present visual indications, and at least one tactile component configured to accept touch input and to provide haptic indications to digits of a hand; and a processor communicatively coupled to the touch screen display and the scanning engine. The processor is configured to perform operations including: operate the display component to display an initial icon on the touch screen display; and monitor the at least one tactile component to detect a commencement of pressing of a tip of a digit of a hand on the touch screen display at the initial icon. The processor is also configured to, in response to the detection of commencement of the digit tip press, and in response to the digit tip press commencing with a pressure greater than a predetermined lower pressure level and less than a predetermined higher pressure level, perform operations including: operate the aiming component to project the visual guide; monitor the at least one tactile component to detect an increase in the pressure of the digit tip press to a level higher than the predetermined higher pressure level; and in response to the detection of the increase in the pressure of the digit tip press to a level higher than the predetermined higher pressure level, operate the scanning component to attempt to scan the encoded data marking within the FOV and operate the at least one tactile component to provide, to the tip of the digit, a haptic indication of the attempt to scan the encoded data marking.

A method includes: operating, by a processor of a decoding device, a display component of a touch screen display of the decoding device to display an initial icon on the touch screen display; and monitoring, by the processor, at least one tactile component of the touch screen display to detect a commencement of pressing of a tip of a digit of a hand on the touch screen display at the initial icon. The method also includes, in response to the detection of the commencement of the digit tip press, and in response to the digit tip press commencing with a pressure greater than a predetermined lower pressure level and less than a predetermined higher pressure level, performing operations including: operating, by the processor, an aiming component of a scanning engine of the decoding device to project a visual guide to assist in aiming the scanning engine at an encoded data marking on a surface of an object; monitoring, by the processor, the at least one tactile component to detect an increase in the pressure of the digit tip press to a level higher than the predetermined higher pressure level; and in response to the detection of the increase in the pressure of the digit tip press to a level higher than the predetermined higher pressure level, operating, by the processor, a scanning component of the scanning engine to attempt to scan the encoded data marking within a field of view (FOV) of the scanning engine, and operating, by the processor, the at least one tactile component to provide, to the tip of the digit, a haptic indication of the attempt to scan the encoded data marking.

Figure 2:
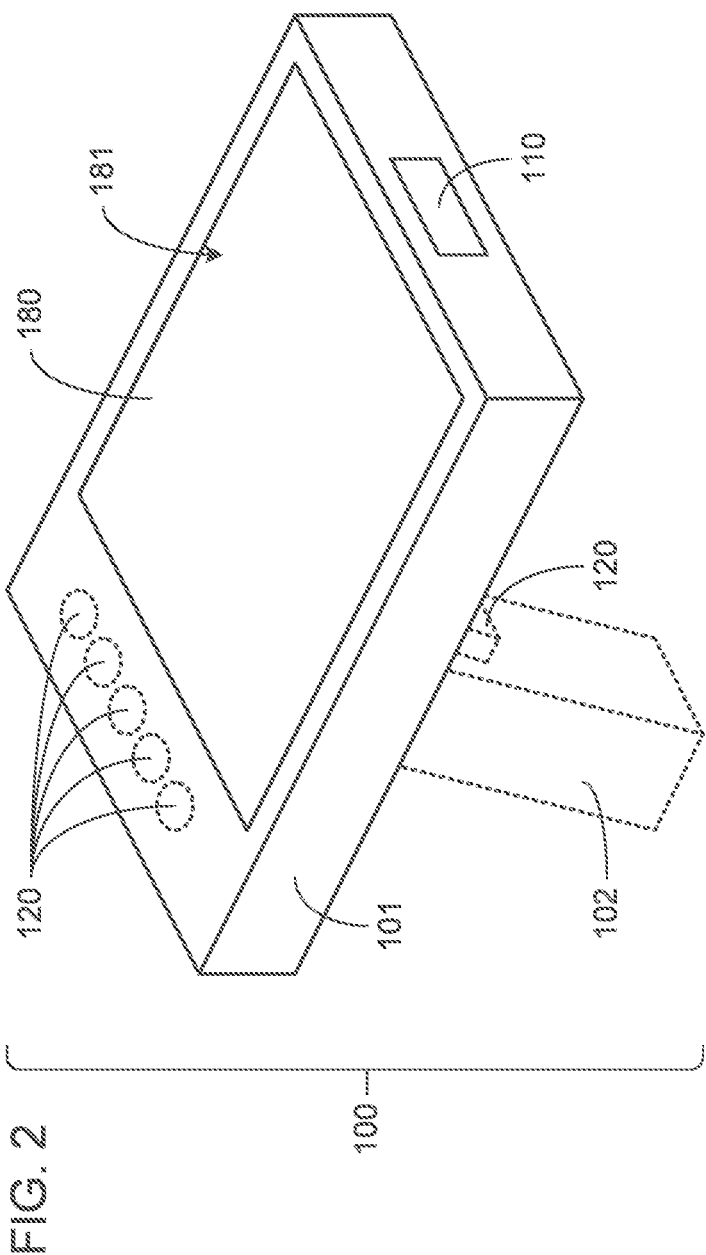
FIG. 2 is a perspective view of the portable electronic device of FIG. 1.

FIGS. 1 and 2, taken together, depict various aspects of a portable scanning device 100 of a scanning system 1000, wherein the scanning device 100 is operable to scan and decode an encoded data marking 775 carried on a portion of a surface 771 of an object 700, before relaying the data decoded from the encoded data marking 775 onward to another device, such as the depicted server 900, via the depicted network 999. FIG. 1 depicts aspects of an embodiment of an internal architecture that may be used within the portable scanning device 100. FIG. 2 depicts aspects of various embodiments of physical configuration of the portable scanning device 100.

Turning more specifically to FIG. 1, as depicted, the portable scanning device 100 may include a scanning engine 110, one or more processors 150, a storage 160, one or more manually-operable controls 120, a touch screen 180, and/or a network interface 190. The scanning engine 110, the storage 160, the manually-operable control(s) 120, the touch screen 180, and/or the network interface 190 may each be communicatively coupled to the one or more processors 150 to exchange data therewith through the exchange of electrical, optical, magnetic and/or other signals through one or more buses and/or other form of interconnect. Each of the one or more processors 150 may be based on any of a wide variety of architectures supporting of a wide variety of instruction sets. In some embodiments, each of the one or more processors 150 may incorporate, or be otherwise accompanied by, a direct memory access (DMA) component (not specifically shown) that may be more capable of more efficiently transferring data representing images of encoded data markings into and/or out of the storage 160.

As depicted, the storage 160 may store a control routine 140. Alternatively or additionally, a portion of the storage 160 may be allocated to serve as a capture buffer 161 within which data representing images of encoded data markings 775 captured by the scanning engine 110 may be stored. Also alternatively or additionally, the storage 160 may store decoded data 163 that includes one or more data values decoded from one or more of such captured encoded data markings 775.

The scanning engine 110 may incorporate a scanning component 112 that may be based on any of a variety of technologies and may employ any of a variety of optical scanning and/or other image capturing techniques to capture image(s) of encoded data marking(s) 775 (e.g., indicia, digital watermarks and/or text) carried on a surface 771 of a portion of an object 700. More specifically, the scanning component 112 may be any of a variety of light sensing components that effect the capture of an image that may include encoded data marking(s) 775, including and not limited to, a charge-coupled device (CCD) or complementary metal-oxide-semiconductor (CMOS) sensor providing a single row of individual light sensors operated in a manner that sweeps over encoded data markings to perform a scan thereof, or a CCD or CMOS sensor providing a two-dimensional (2D) array of individual light sensors to capture a 2D image of one or more encoded data markings. In some embodiments, the scanning engine 110 may additionally incorporate, or be otherwise accompanied by, any of a variety of optical components (e.g., lenses, mirrors, color-adjusting gels, etc.—not specifically shown) that may manipulate the light arriving at the scanning engine 110 from within the filed of view (FOV) 712 of the scanning engine 110 in any of a variety of ways before it reaches the scanning component 112.

The scanning engine 110 may additionally incorporate an aiming component 118 that projects one or more visual aiming guides 718 onto the surface 771 of the object within and/or near the FOV 712 to aid an operator of the scanning device 100 in maneuvering the scanning device 100 to cause the encoded data marking 775 to be positioned within the FOV 712 in preparation for being captured. An example of such a visual guide 718 may be the single depicted dot-shaped visual guide 718, which may be generated by a combination of a lighting component (e.g., a light-emitting diode or an incandescent bulb) and a lens. Another alternate example of such a visual guide 718 may be a cross-shaped visual guide 718 (not specifically shown) that may be generated by one or more laser diodes.

The scanning engine 110 may further incorporate, or be otherwise accompanied by, any of a variety of types of light source 111 (e.g., a broad spectrum light source, single frequency light source, collimated light source, etc.—not specifically shown) that may serve to illuminate the surface 771 of the object 700 within the FOV 712 in a manner that enhances the ability of the scanning component 112 to capture an image of a portion of that surface 771 of that object 700.

The object 700 on which the encoded data markings are carried may each be any of a variety of objects, including and not limited to, a package carrying a shipping label that includes encoded data marking(s), or a product for sale within retail packaging on which encoded data marking(s) are printed as part of the graphical artwork thereof. The data encoded within such encoded data markings may include, and not be limited to, data indicating the addresses of a sender and/or intended recipient of a package, or data providing a universal product code (UPC) that uniquely identifies a product for sale. Each encoded data marking that is implemented as an indicia may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; Aztec Code; Code 1; ColorCode; Color Construct Code; CrontoSign; CyberCode; d-touch; Data-Glyphs; Data Matrix; Datastrip Code; digital paper; EZcode;

Color; High Capacity Color Barcode; HueCode; InterCode; MaxiCode; MMCC; NexCode; Nintendo e-Reader; Dotcode; PDF417; QR code; ShotCode; and SPARQCode.

The touch screen 180 may incorporate a display component 188 that may be based on any of a wide variety of display technologies, including and not limited to, a liquid crystal display (LCD), an electro-luminescent (EL) display, a gas plasma display, a light-emitting diode (LED) display, etc. Each of such technologies may be used to provide a two-dimensional (2D) array of pixels that may be selectively illuminated and/or configured with a selectable color to display any of a variety of images, including photographic images, animated images, computer-generated graphical images, textual images, etc.

The touch screen 180 may additionally incorporate one or more tactile components 182 that may enable the touch screen 180 to detect manual input from an operator of the scanning device 100, such as the touch of the tips of digits and/or of a stylus against a touch surface 181 that is provided by the touch screen 180. Each of the tactile components 182 may be based on any of a wide variety of pressure-sensing technologies, including and not limited to, magnetic transducers, and piezo transducers incorporating piezo crystals that generate an electrical output in response to force being applied thereto. Additionally, each of such tactile components 182 may also be operable in a reverse manner to actually convert electrical input into mechanical motion to cause movement of the touch surface 181 in a manner that may be used to provide haptic feedback detectable by the tips of the digits of an operator of the scanning device 100.

However, it should be noted that, while the tactile components 182 are depicted and discussed herein as each serving to both detect manual input and provide haptic feedback, other embodiments are possible in which there may be separate components that serve to separately perform each of these two functions. More specifically, and by way of example, while there may be piezo, magnetic and/or other type(s) of transducers used to detect manual input, entirely separate additional components may also be included to convert electrical input into mechanical motion to provide haptic feedback. Such separate components may include, and not limited to, linear resonant actuators (LRAs), rotary motors coupled to worm drives, and/or actuators based on materials having "shape memory" properties, such as nickel titanium alloys.

Referring to FIG. 2, in addition to FIG. 1, the touch display 180 may be mounted and positioned within a primary portion 101 of the casing of the scanning device 100 such that the touch screen 180 cooperates with other exterior components of the primary portion 101 of the casing to provide the touch surface 181 as part of the overall external surface of the primary portion 101 of the casing. In this way, an operator of the scanning device 100 may be able to interact with the touch surface 181 as part of the exterior of the primary portion 101 to provide manual input to the scanning device 100 and/or to receive haptic feedback therefrom.

FIG. 3A provides a cross-sectional view of one example implementation in which the touch surface 181 is provided directly by display component 188 positioned to define part of the external surface of the primary portion 101 of the casing. In such an implementation, the display component 188 is directly subject to the instances of pressure being exerted against the touch surface 181 by tips of digits and/or by a stylus as part of the provision of manual input to the scanning device 100. In this way, the display component 188 is relied upon to serve as a mechanical component that relays such instances of pressure to the one or more tactile components 182 to enable the detection of such manual input. Correspondingly, the display component 188 may also be relied upon to serve as a mechanical component that relays movement generated by the one or more tactile components 182 back to such tips of digits as part of providing haptic feedback thereto.

FIG. 3B provides a cross-sectional view of another example implementation in which the touch surface 181 is provided by a transparent component of the primary portion 101 of the casing, with the display component 188 positioned behind that transparent component. In such an implementation, the display component 188 is entirely isolated from the instances of pressure being exerted against the touch surface 181 by tips of digits and/or by a stylus as part of the provision of manual input to the scanning device 100. In this way, it is the transparent component of the primary portion 101 of the casing that is relied upon to serve as a mechanical component that relays such instances of pressure to the one or more tactile components 182 to enable the detection of such manual input. Correspondingly, it is the transparent component of the primary portion 101 of the casing that may also be relied upon to serve as a mechanical component that relays movement generated by the one or more tactile components 182 back to such tips of digits as part of providing haptic feedback thereto.

Referring back to FIGS. 3A and 3B, again, it should be noted that while the tactile components 182 are depicted and discussed herein as each serving to both detect manual input and provide haptic feedback, other embodiments are possible in which there may be entirely separate components that serve to separately perform each of these two functions. More specifically, it may be that entirely separate additional components (e.g., LRAs, rotary motors coupled to worm drives, and/or actuators employing shape memory materials) may be used to mechanically move the display component 188 to provide haptic feedback in the example implementation of FIG. 3A, or used to mechanically move the transparent component that overlies the display component 188 to provide haptic feedback in the example implementation of FIG. 3B. As still another alternative, one or more of such separate components may be disposed elsewhere within the portable scanning device 100 to exert a vibratory mechanical force against another portion of the casing thereof (beyond the transparent component of FIG. 3B) that is mechanically transmitted to the touch surface 181 to provide haptic feedback.

Returning to FIG. 1, the storage 160 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 160 may be based on any of a variety of non-volatile storage technologies.

Each of the one or more processors 150 may include any of a wide variety of processors, microcontrollers, gate-array logic devices, etc. that may be incorporate any of a variety of features to enhance speed and/or efficiency of processing operations. Such features may include and are not limited to, multi-threading support per core component, multiple processing core components, directly integrated memory control functionality, and/or various modes of operation by which speed of throughput and/or level of power consumption may be dynamically altered.

Each of the one or more processors 150 may be implemented as a single semiconductor die within a single package. Alternatively, each processor 350 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the one or more processors 150 may incorporate one or more core components, one or more graphics processing unit (GPU) components, and/or one or more single-instruction multiple-data (SIMD) components to provide any of a variety of processing architectures for performing any of a variety of operations. Each of the one or more ore components, the one or more GPU components, and/or the one or more SIMD components may, themselves, employ different processing architectures supporting different portions of instruction sets to perform different operations. By way of example, each of the one or more core components may support a larger and more complex instruction set than the one or more GPU components and the one or more SIMD component, and therefore, may support a wider range of operations with a relatively limited number of operands, which may include a wider range of branching instructions. In contrast, the one or more GPU components and/or the one or more SIMD components may support a smaller and less complex instruction set than the one or more core components, but may support the performance of that narrower range of operations across numerous operands at least partially in parallel. For the one or more GPU components, this may be realized through the at least partially parallel performance of the same operations on many separate pieces of data across numerous GPU cores. For the one or more SIMD components, this may realized with sets of multiple operands supported in side-by-side lanes of a set of SIMD registers. However, the one or more GPU components, and the one or more the SIMD components may not support branching instructions. As a result, in executing instructions, the operation and use of the one or more GPU components and/or of the one or more SIMD component may be controlled by the one or more core components.

The network interface 190 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, each of the network interfaces 190 and 590 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Turning more specifically to FIG. 2, the casing of the portable scanning device 100 may include a secondary portion 102 that, in combination with the primary portion 101, gives the portable device 100 a generally pistol-like physical configuration. As depicted, an upper end of the secondary portion 102 may be formed integrally with the primary portion 101 at a location and with an orientation that causes the secondary portion 102 to serve as the grip portion of such a pistol-like physical configuration. In some embodiments, it may be that the secondary portion 102 is implemented as an optional attachment that may be removably connectable to the primary portion 101. In some of such embodiments, the primary portion 101 may be implemented as a fully complete portable computing device having a configuration very much like what has become commonplace in the physical configuration of typical "smart phones" in which touch screen 180 may be positioned to form part of one of the larger surfaces thereof.

Referring to FIG. 1 in addition to FIG. 2, as depicted, either or both of the primary portion 101 and the secondary portion 102 may additionally incorporate one or more manual controls 120. One or more of such manual controls 120 may be a mechanically depressible button, and as depicted, one of such mechanically depressible buttons may be positioned on the secondary portion 102 to be operable in a manner reminiscent that serves as the "trigger" of the pistol-like physical configuration defined by the depicted combination of the primary portion 101 and the second portion 102.

Returning to FIG. 1, the control routine 140 may incorporate a sequence of instructions operative on the processor(s) 150 to implement logic to perform various functions associated with capturing and decoding encoded data markings 775. In executing the control routine 140, the processor(s) 150 may be caused to operate the scanning engine 110 to capture an image of an encoded data marking 775 that is positioned within the FOV 712, storing the captured image within the capture buffer 161, decoding the encoded data marking 775 within that captured image, and operating the network interface 190 to transmit a copy of the decoded data 163 that results from such decoding to another device (e.g., the depicted server 900) via a network 999. Such capture, decoding and transmission operations may be performed in response to a series of particular interactions that occur via a user interface (UI) that includes the touch screen 180.

Figure 4B:
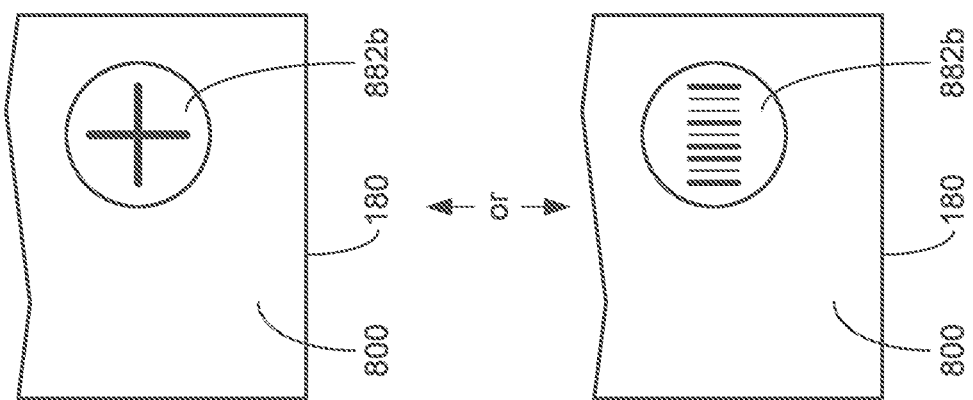
FIGS. 4A, 4B, 4C and 4D depict various aspects of a user interface of the scanning device of FIG. 1.
Figure 4A:
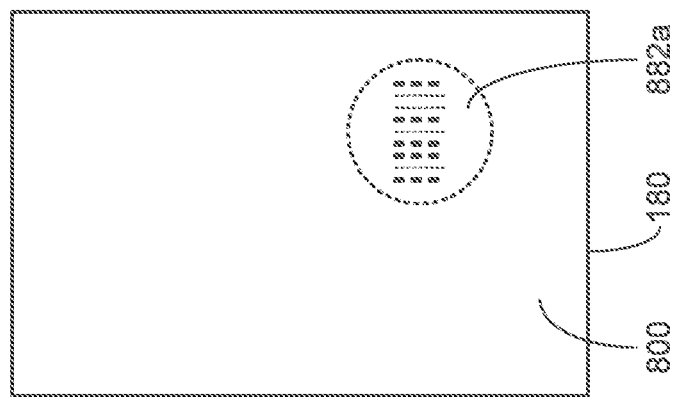

More specifically, and referring to FIG. 4A in addition to FIG. 1, the processor(s) 150 may be caused by execution of the control routine 140 to operate the display component 188 of the touch screen 180 to display an initial icon 882a that is meant to serve as a virtual button control. Stated differently, the initial icon 882a visually marks a location on the touch surface 181 that is operable with a touch of a tip of a digit to trigger the performance of one or more functions. As will shortly be discussed, use of the scanning device 100 to attempt to capture and decode an encoded data marking 775 may be accompanied by the replacement of the initial icon 882a with another icon that provides a visual indication that the scanning device 100 has been transitioned into another mode in which it is engaged in a process leading to such an attempted capture and decode. Thus, the visual presentation of the initial icon 882a may serve to provide an indication that the scanning device 100 is currently in a state in which it is not so engaged.

In addition to causing the initial icon 882a to be displayed, the processor(s) 150 may monitor the one or more tactile components 182 of the touch screen 180 to detect an instance of pressure applied to the touch surface 181 that is consistent with a tip of a digit touching the touch surface 181 at the location of the initial icon 882a, and with a level of pressure applied at that location that is greater than a lower predetermined threshold and is less than an upper predetermined threshold. In response to such a touch, the processor(s) 150 may be caused to put the scanning device 100 into an aiming mode in which the processor(s) 150 may be caused to operate the aiming component 118 to project a visual aiming guide 718 onto a surface 771 of an object on which an encoded data marking 775 may be carried. The processor(s) 150 may be caused to keep the scanning device 100 in the aiming mode for as long as a level of pressure between the lower and upper predetermined thresholds continues to be applied at the location of the initial icon 882a.

Referring to FIG. 4B in addition to FIG. 1, in some embodiments, the processor(s) 150 may, also during the aiming mode, operate the display component 188 to replace the initial icon 882a with an aiming icon 882b to provide a visual indication on the touch display 180 that confirms that the scanning device 100 is in the aiming mode. FIG. 4B depicts two possible embodiments of the aiming mode icon 882b, including one that may resemble an aiming cross, and another that may resemble the initial icon 882a, but with different colors (e.g., bolder colors, brighter colors, higher contrast colors, etc.).

In some embodiments, at the onset of the aiming mode and/or during the aiming mode, it may be the processor(s) 150 are caused by the execution of the control routine 140 to operate the tactile component(s) 182 of the touch screen 180 to provide haptic feedback that confirms entry into the aiming mode and/or that the scanning device 100 is still in the aiming mode. Such haptic feedback may be entail the generation of any of a variety of physical sensations that are meant to be felt through the tip of the digit that was pressed against the touch surface 181 to cause the entry into the aiming mode. Such haptic feedback may include, and not limited to, a continuous, varying or pulsing vibration, and/or providing a sensation of touching a mechanical button or other mechanically moveable manual control. However, it should be noted that the provision of haptic feedback associated with the aiming mode may be deemed redundant to the provision of the visual aiming guide 718, especially since the operator would necessarily see the visual aiming guide 718 as part of using the visual aiming guide 718 to guide the maneuvering of the scanning device 100 to put an encoded data marking 775 within the FOV 712.

Figure 4D:
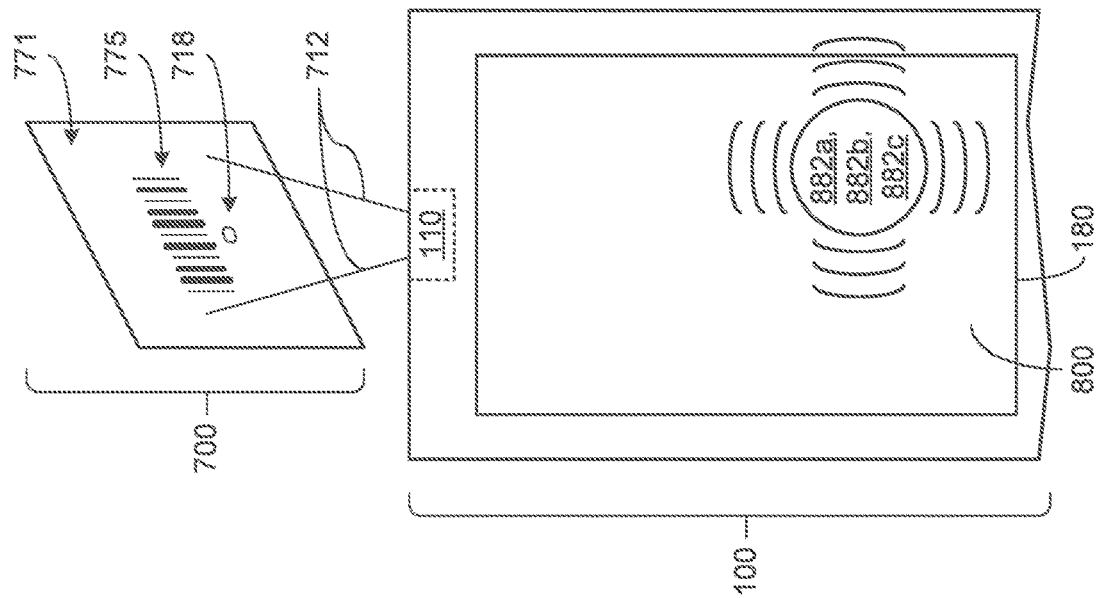
Figure 4C:
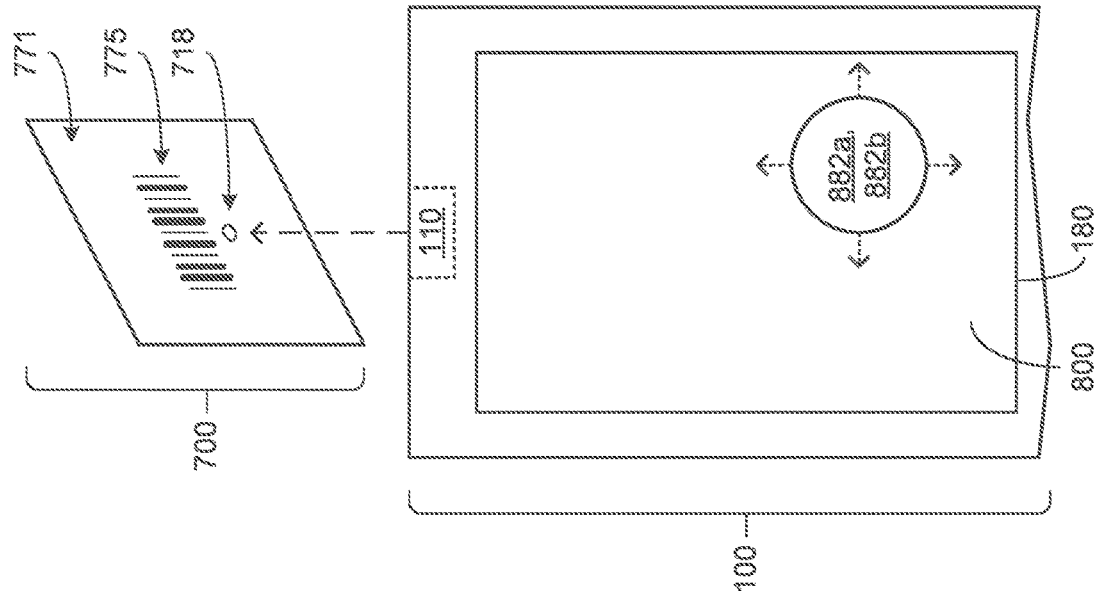

Referring to FIG. 4C in addition to FIG. 1, in some embodiments, the onset of the aiming mode may also commence a time period during which the processor(s) 150 may be caused by further execution of the control routine 140 to monitor the tactile component(s) 182 for a change in the location of the application of pressure (still at a level between the lower and upper predetermined thresholds) that is consistent with a sliding movement of the tip of a digit across the touch surface 181. In such embodiments, the processor(s) 150 may be caused to respond to such a detected change in location of the application of pressure as being manual input indicative of a desire to change the location at which at least the initial icon 882a was originally located (unless replaced by an aiming icon 882b). Thus, in such embodiments, the processor(s) 150 may respond by operating the display component 188 to repeatedly update the location of the icon 882a or 882b to cause the icon 882a or 882b to move in a manner that follows the detected sliding movement of the tip of a digit.

Referring to FIG. 4D in addition to FIG. 1, during the aiming mode, the processor(s) 150 are caused by further execution of the control routine 140 to monitor the tactile component(s) 182 for an increase in the pressure applied to the touch surface 181 that is consistent with an increase in the pressure applied by the tip of the digit at the location of the icon 882a or 882b, and to a level above the upper predetermined threshold. In response to such a touch, the processor(s) 150 may be caused to transition the scanning device 100 out of the aiming mode, and into a scanning mode in which the processor(s) 150 may be caused to operate the scanning component 112 to attempt to capture an image of an encoded data marking 775 within the FOV 712, and to then attempt to decode such an encoded data marking 775 within that captured image. This transition from the aiming mode to the scanning mode is based on a presumption that the operator of the scanning device 100 has maneuvered the scanning device 100 into a location and orientation that places an encoded data marking 775 within the FOV 712 such that there is an encoded data marking 775 within the FOV 712 to be captured and decoded. As will be familiar to those skilled in the art, at least during the scanning mode (if not also during the aiming mode), the light source 111 may be operated by the processor(s) 150 to provide sufficient illumination of a surface 771 of an object 700 within the FOV 712 as to enable a successful capture of an encoded data marking 775 that may be carried on the portion of that surface 771 that is within the FOV 712.

If the attempt at capturing and decoding an encoded data marking during the scanning mode is successful, then the processor(s) 150 may be caused by the execution of the control routine 140 to operate the tactile component(s) 182 of the touch screen 180 to provide haptic feedback that is indicative of that success. Such haptic feedback may entail the generation of any of a variety of physical sensations that are meant to be felt through the tip of the digit that was pressed against the touch surface 181 with pressure above the upper predetermined threshold to cause the entry into the scanning mode. In some embodiments, such haptic feedback may entail the provision of a continuous, varying or pulsing vibration sensation at the tip of the digit. However, in other embodiments, such haptic feedback may entail the provision of a sensation of pressing a mechanically depressible button such that it is depressed, and is not simply touched.

More precisely, the haptic feedback that is provided may include the provision of two distinct tactile sensations: 1) the provision of an initial sensation of touching the surface of a mechanically depressible button to provide an indication of entry into the scanning mode and/or commencement of the attempt to capture and decode an encoded data marking 775, and 2) the provision of a subsequent sensation of that same mechanically depressible button being depressed to provide an indication of success in the capture and decoding of an encoded data marking 775. Thus, where the attempt to capture and decode an encoded data marking 775 is not successful, then the initial sensation of touching the surface of a mechanically depressible button may not change into the subsequent sensation of depressing it, and instead, the initial sensation of touching the surface of that mechanically depressible button may simply cease. Alternatively, in response to an unsuccessful attempt to capturing and decoding, an entirely different type of haptic feedback may be provided as an indication of such a failure (e.g., a particular continuous, varying or pulsing vibration).

In some embodiments, it may be that the transition into the scanning mode is additionally indicated by the processor(s) 150 being caused to operate the display component 188 of the touch screen to display a scanning icon 882c (no particular example of which is specifically shown). Such a display of such a scanning icon 882c may cease once the attempt at scanning and decoding has been completed, and regardless of whether the attempt was successful.

Regardless of whether an encoded data marking 775 is successfully captured and decoded, or not, the processor(s) 150 may cause the scanning device 150 to automatically transition out of the scanning mode following the attempt. In some embodiments, the processor(s) may be caused to enforce a requirement that the operator must at least reduce the pressure applied to the touch surface 181 to a level that falls below the upper predetermined threshold (if not also below the lower predetermined threshold) before at least the scanning mode can be entered into, again.

Referring back to FIGS. 4A-C in addition to FIG. 1, as will be familiar to those skilled in the art, such a portable device as the scanning device 100 may be provided with electrical power stored within one or more batteries incorporated into the scanning device such that it may be deemed desirable to implement various measures to conserve electric power. Thus, in some embodiments, the processor(s) 150 may be caused to enforce a time limit on the amount of time during which the scanning device 100 may be caused to remain in the aiming mode. In this way, an upper limit may be imposed on the amount of time during which the aiming component 118 may be operated to project the visual aiming guide 718. Thus, in some of such embodiments, it may be that, once such an upper limit of time has been reached, the processor(s) 150 may be caused to transition the scanning device 100 out of the aiming mode. This may be deemed a desirable limitation to impose to address a situation in which the scanning device 100 is not actually being operated by an operator to place it in the aiming mode, and instead, has been accidentally caused to enter the aiming mode as a result of an object being pressed against the touch surface 181 at the location of the initial icon 882a.

FIGS. 5A through 5E, together, provide a flow chart of a manner of preparation and use of the portable scanning device 100.

Starting with FIG. 5A, at 2110, processor(s) of a portable scanning device may be caused by the execution of a control routine to operate a display component of a touch screen of the portable scanning device to display an initial icon that may be indicative of at least a scanning engine of the portable scanning device not currently being engaged in preparing for or attempting a scan of an encoded data marking.

At 2120, the processor(s) may be caused to monitor one or more tactile components of the touch screen for an instance of an application of pressure against a touch surface of the touch screen that is consistent with the tip of a digit being pressed against the touch surface at the location of the initial icon, and with a level of pressure that is greater than at least a lower predetermined pressure level. At 2122, a check may be made as to whether such an instance of such pressure has been detected. If not at 2122, then the monitoring for such pressure continues at 2120.

However, if at 2122, such an instance of pressure has been detected, then at 2130, a check may be made as to whether the level of pressure is higher than a higher predetermined pressure level. If so at 2130, then the scanning device may transition into a scanning mode and an attempt may be made to capture and decode an encoded data marking, as described in FIG. 5B.

However, if at 2130, the level of pressure is not higher than the upper predetermined pressure level, then at 2140, a check may be made as to whether a change in location of the pressure has been detected that is consistent with the tip of the digit sliding across the touch surface of the touch screen. If not, then the scanning device may transition into an aiming mode and an aiming guide may be provided to enable aiming of the scanning device at an encoded data marking, at described starting in FIG. 5C

However, if at 2140, there such a change in location of the pressure has been detected, then the processor(s) may be caused to change the location at which at least the initial icon is to be displayed on the touch screen, as described in FIG. 5E.

Figure 5B:
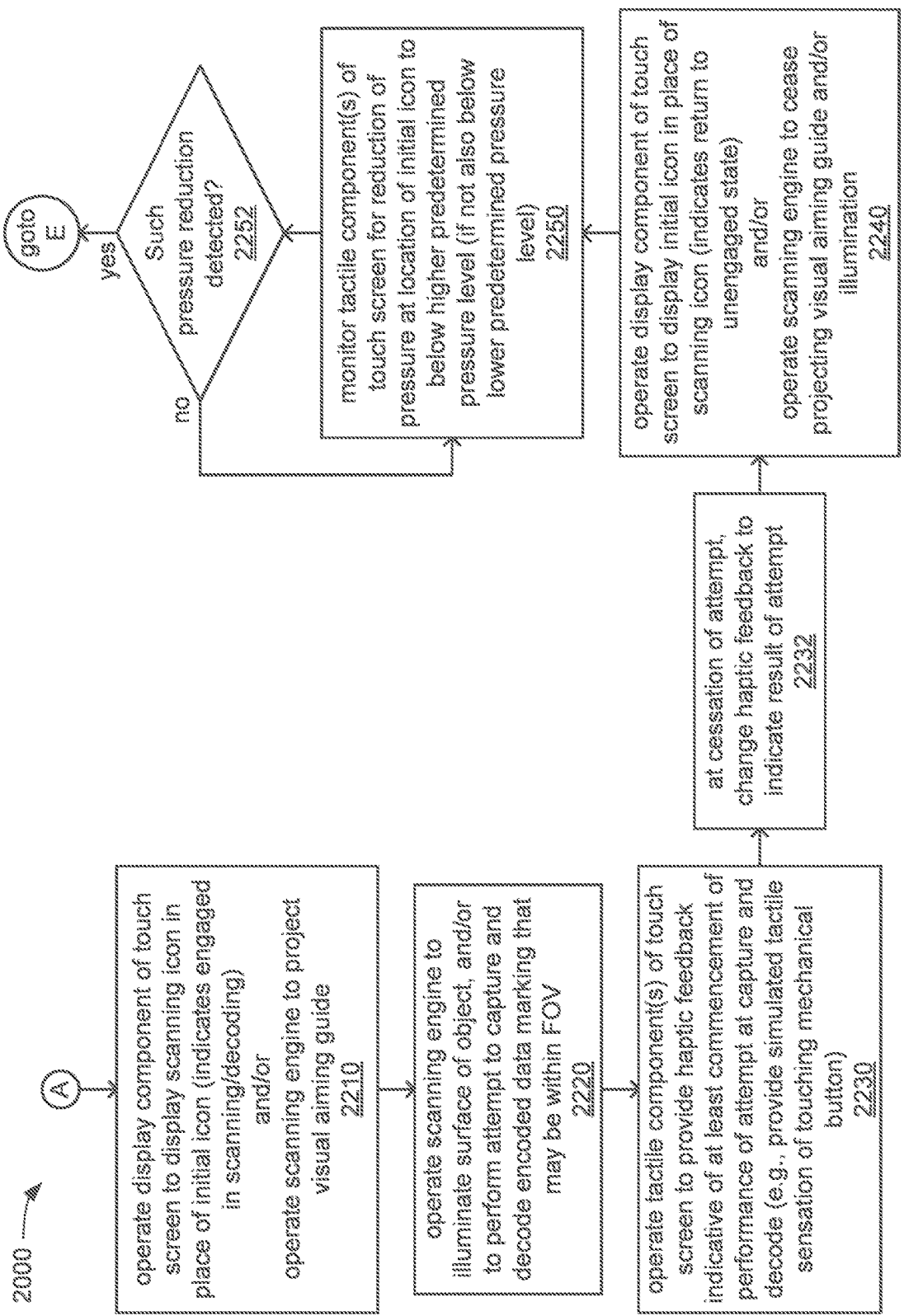

Turning to FIG. 5B, in response to the detection of higher pressure at 2130 in FIG. 5A, at 2210, the processor(s) may be caused to: 1) operate the display component of the touch screen to display a scanning icon in place of the initial icon to provide a visual indication of entry of the scanning device directly into the scanning mode, and/or 2) operate the scanning engine to project the visual aiming guide to better enable an operator of the scanning device to maneuver the scanning device to cause an encoded data marking carried on a surface of an object to be positioned within the FOV of the scanning engine.

At 2220, the processor(s) may be caused to operate the scanning engine to illuminate the surface of the object, and/or to perform an attempt to capture an image of an encoded data marking that may be within the FOV of the scanning engine.

At 2230, the processor(s) may be caused to operate the tactile component(s) of the touch screen to provide haptic feedback that is indicative of at least the commencement of the attempt to capture and decode an encoded data marking. As has been discussed, such a tactile feedback may include providing the sensation of touching, but not depressing, a mechanical button. At 2232, following the cessation of the attempt, the processor(s) may be caused to change the haptic feedback initially provided at 2230 to a subsequent haptic feedback that is indicative of the result of the attempt. More specifically, and as previously discussed, where the attempt was successful, then the subsequent haptic feedback may include providing a sensation of the simulated mechanical button being depressed. Alternatively, where the attempt was unsuccessful, then the subsequent haptic feedback may include a simple cessation of the provision of the initial haptic feedback, or may include providing a constant, varying or pulsing vibration sensation.

At 2240, the processor(s) may be caused to: 1) operate the display component of the touch screen to display the initial icon in place of the scanning icon to provide a visual indication of leaving the scanning mode and returning to the unengaged state, and/or 2) operate the scanning engine to cease the projection of the visual aiming guide and/or the provision of illumination.

At 2250, the processor(s) may be caused to monitor the tactile component(s) of the touch screen for an instance of reduction in the application of pressure against a touch surface of the touch screen that is consistent with the tip of a digit being pressed against the touch surface at the location of the initial icon with a reduced level of pressure that is less than at least the higher predetermined pressure level (if not also less than the lower predetermined level). At 2252, a check may be made as to whether such an instance of such reduced pressure has been detected. If not at 2252, then the monitoring for such reduced pressure continues at 2250.

However, if at 2252, such an instance of reduced pressure has been detected, then the scanning device may return to monitoring for an instance of detection of pressure from a tip of a digit with a level of pressure that is greater than at least the lower predetermined pressure level at 2120 in FIG. 5A.

Figure 5C:
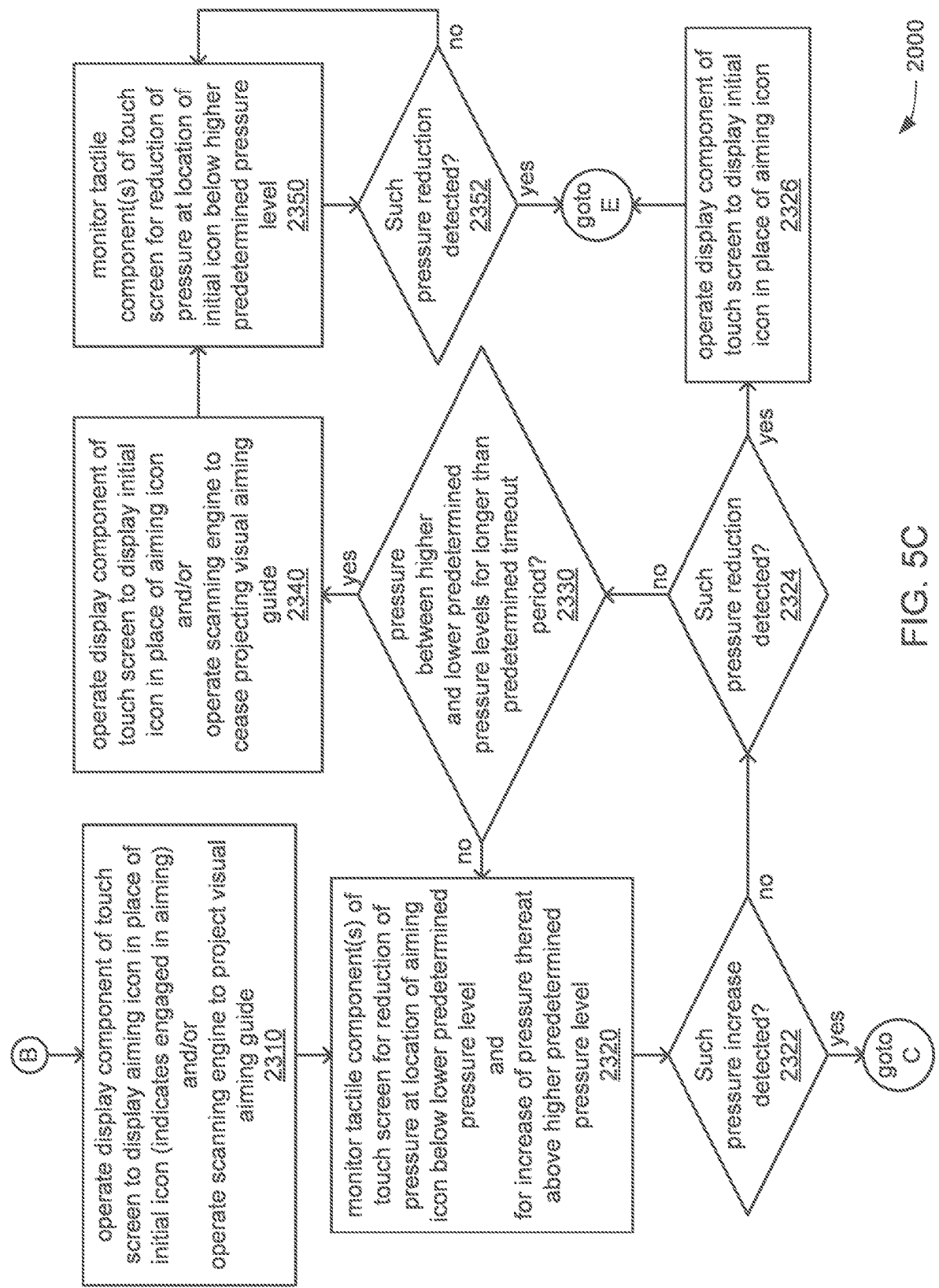

Turning to FIG. 5C, in response to not detecting higher pressure at 2130, and to not detecting a change in location of application of the pressure at 2140 in FIG. 5A, at 2310, the processor(s) may be caused to: 1) operate the display component of the touch screen to display an aiming icon in place of the initial icon to provide a visual indication of entry of the scanning device directly into the aiming mode, and/or 2) operate the scanning engine to project the visual aiming guide.

At 2320, the processor(s) may be caused to monitor the tactile component(s) of the touch screen for an instance of either a reduction in the pressure applied at the location of the aiming icon that falls below the lower predetermined pressure level, or an increase in the pressure applied at that location that rises above the higher predetermined pressure level. At 2322, a check may be made as to whether such an increase in pressure has been detected. If so at 2322, then the scanning device may transition into the scanning mode and an attempt may be made to capture and decode an encoded data marking, as described in FIG. 5D.

However, if at 2322, such an increase in pressure has not been detected, then at 2324, a check may be made as to whether such a reduction in pressure has been detected. If so at 2324, then the scanning device may return to monitoring for an instance of detection of pressure from a tip of a digit with a level of pressure that is greater than at least the lower predetermined pressure level at 2120 in FIG. 5A.

However, if at 2324, such a reduction in pressure has been detected, then at 2330, a check may be made as to whether the pressure has remained between the higher and lower predetermined pressure levels for longer than a predetermined timeout period. If not at 2330, then the monitor for both such an increase in pressure and such a reduction in pressure continues at 2320.

However, if at 2330, the predetermined timeout period has been so exceeded, then at 2340, the processor(s) may be caused to: 1) operate the display component of the touch screen to display the initial icon in place of the aiming icon to provide a visual indication of leaving the aiming mode and returning to the unengaged state, and/or 2) operate the scanning engine to cease the projection of the visual aiming guide.

At 2350, the processor(s) may be caused to monitor the tactile component(s) of the touch screen for an instance of reduction in the application of pressure against a touch surface of the touch screen that is consistent with the tip of a digit being pressed against the touch surface at the location of the initial icon with a reduced level of pressure that is less than at least the higher predetermined pressure level (if not also less than the lower predetermined level). At 2352, a check may be made as to whether such an instance of such reduced pressure has been detected. If not at 2352, then the monitoring for such reduced pressure continues at 2350.

However, if at 2352, such an instance of reduced pressure has been detected, then the scanning device may return to monitoring for an instance of detection of pressure from a tip of a digit with a level of pressure that is greater than at least the lower predetermined pressure level at 2120 in FIG. 5A.

Figure 5D:
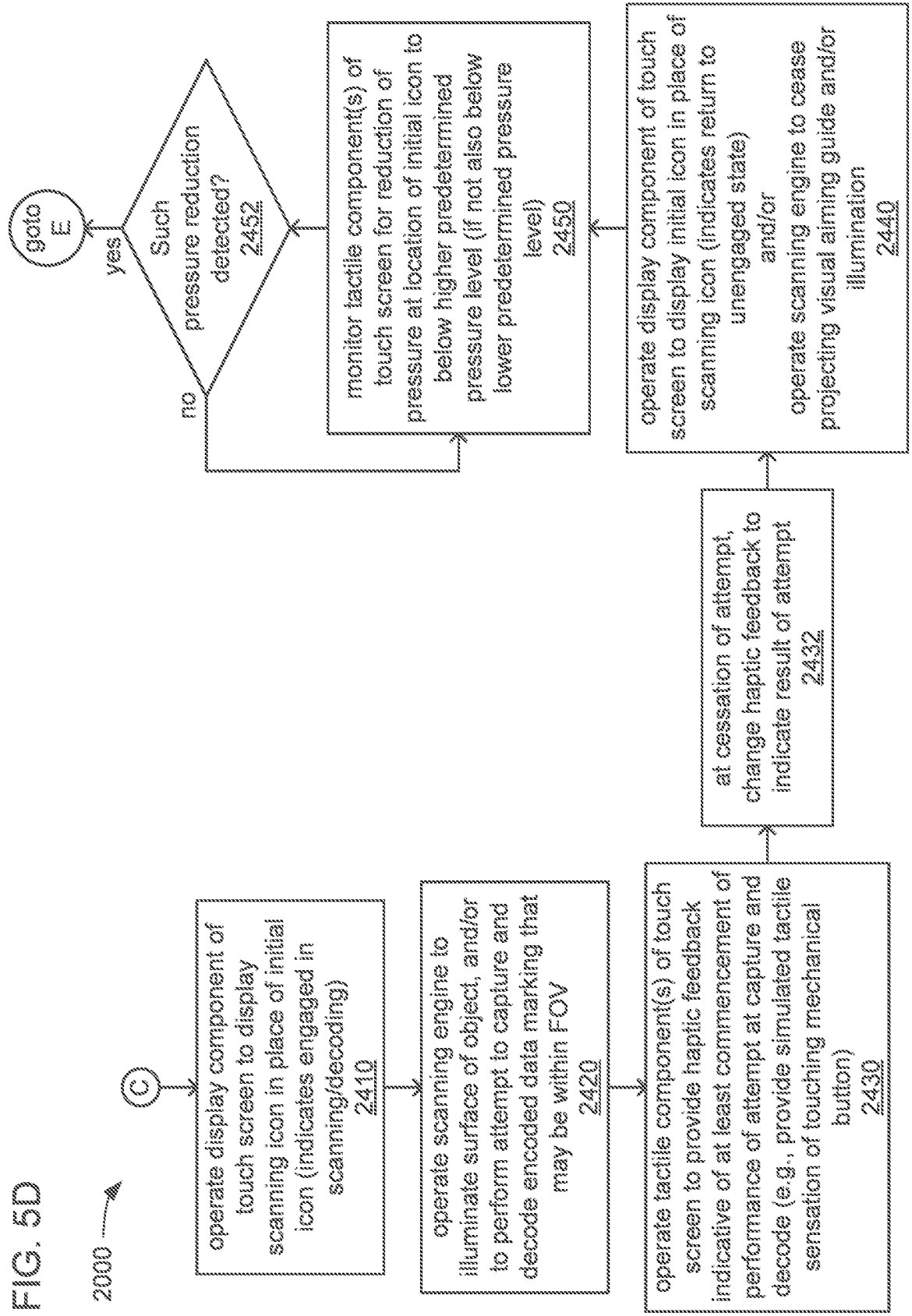

Turning to FIG. 5D, in response to the detection of higher pressure at 2322 in FIG. 5C, at 2410, the processor(s) may be caused to operate the display component of the touch screen to display a scanning icon in place of the initial icon to provide a visual indication of entry of the scanning device directly into the scanning mode.

At 2420, the processor(s) may be caused to operate the scanning engine to illuminate the surface of the object, and/or to perform an attempt to capture an image of an encoded data marking that may be within the FOV of the scanning engine.

At 2430, the processor(s) may be caused to operate the tactile component(s) of the touch screen to provide haptic feedback that is indicative of at least the commencement of the attempt to capture and decode an encoded data marking. At 2432, following the cessation of the attempt, the processor(s) may be caused to change the haptic feedback initially provided at 2430 to a subsequent haptic feedback that is indicative of the result of the attempt.

At 2440, the processor(s) may be caused to: 1) operate the display component of the touch screen to display the initial icon in place of the scanning icon to provide a visual indication of leaving the scanning mode and returning to the unengaged state, and/or 2) operate the scanning engine to cease the projection of the visual aiming guide and/or the provision of illumination.

At 2450, the processor(s) may be caused to monitor the tactile component(s) of the touch screen for an instance of reduction in the application of pressure against a touch surface of the touch screen that is consistent with the tip of a digit being pressed against the touch surface at the location of the initial icon with a reduced level of pressure that is less than at least the higher predetermined pressure level (if not also less than the lower predetermined level). At 2452, a check may be made as to whether such an instance of such reduced pressure has been detected. If not at 2452, then the monitoring for such reduced pressure continues at 2450.

However, if at 2452, such an instance of reduced pressure has been detected, then the scanning device may return to monitoring for an instance of detection of pressure from a tip of a digit with a level of pressure that is greater than at least the lower predetermined pressure level at 2120 in FIG. 5A.

Turning to FIG. 5E, in response to the detection of changing location at 2140 in FIG. 5A, at 2510, the processor(s) may be caused to operate the display component of the touch screen to display a aiming icon in place of the initial icon.

At 2520, the processor(s) may be caused to operate the display component to move the aiming icon to follow the changing location of the tip of the digit.

At 2530, the processor(s) may be caused to monitor the tactile component(s) of the touch screen for an instance of reduction in the application of pressure against a touch surface of the touch screen that is consistent with the tip of a digit being pressed against the touch surface at the location of the initial icon with a reduced level of pressure that is less than at least the higher predetermined pressure level (if not also less than the lower predetermined level). At 2532, a check may be made as to whether such an instance of such reduced pressure has been detected. If not at 2532, then the monitoring for such reduced pressure continues at 2530.

However, if at 2532, such an instance of reduced pressure has been detected, then at 2540, the processor(s) may be caused to operate the display component of the touch screen to display the initial icon in place of the aiming icon, before the scanning device returns to monitoring for an instance of detection of pressure from a tip of a digit with a level of pressure that is greater than at least the lower predetermined pressure level at 2120 in FIG. 5A.

There is thus disclosed a decoding device and method for capturing and decoding an encoded data marking that includes providing a UI that enables the use of a touch screen in place of a mechanical depressible button.

A decoding device includes: a scanning engine comprising an aiming component configured to project a visual guide to assist in aiming the scanning engine at an encoded data marking on a surface of an object, and a scanning component configured to scan an encoded data marking within a field of view (FOV) of the scanning engine; a touch screen display comprising a display component configured to visually present visual indications, and at least one tactile component configured to accept touch input and to provide haptic indications to digits of a hand; and a processor communicatively coupled to the touch screen display and the scanning engine. The processor is configured to perform operations including: operate the display component to display an initial icon on the touch screen display; and monitor the at least one tactile component to detect a commencement of pressing of a tip of a digit of a hand on the touch screen display at the initial icon. The processor is also configured to, in response to the detection of commencement of the digit tip press, and in response to the digit tip press commencing with a pressure greater than a predetermined lower pressure level and less than a predetermined higher pressure level, perform operations including: operate the aiming component to project the visual guide; monitor the at least one tactile component to detect an increase in the pressure of the digit tip press to a level higher than the predetermined higher pressure level; and in response to the detection of the increase in the pressure of the digit tip press to a level higher than the predetermined higher pressure level, operate the scanning component to attempt to scan the encoded data marking within the FOV and operate the at least one tactile component to provide, to the tip of the digit, a haptic indication of the attempt to scan the encoded data marking.

The attempt to scan the encoded data marking may include an attempt to capture the encoded data marking and an attempt to decode the encoded data marking; and the haptic indication of the attempt to scan the encoded data marking may include a selection from among two different tactile sensations based on whether the attempt to capture the encoded data marking and the attempt to decode the encoded data marking were both successful.

The haptic indication of the attempt to scan the encoded data marking may include a simulation of a tactile sensation of fully depressing a mechanical button.

The processor may be further configured to perform operations including: in response to the detection of the commencement of the digit tip press, and in response to the digit tip press commencing with a pressure greater than the predetermined lower pressure level and less than the predetermined higher pressure level, operate the at least one tactile component to provide, to the tip of the digit, a haptic indication of the detection of the digit tip press; and in response to the detection of the increase in the pressure of the digit tip press to a level higher than the predetermined higher pressure level, operate the at least one tactile component to cease providing the haptic indication of detection of the digit tip press to enable the provision of the haptic indication of the attempt to scan the encoded data marking.

The processor may be further configured to perform operations including: in response to the detection of the commencement of the digit tip press, and in response to the digit tip press commencing with a pressure greater than the predetermined lower pressure level and less than the predetermined higher pressure level, operate the display component to display an aiming icon in place of the initial icon on the touch screen display; and in response to the detection of the increase in the pressure of the digit tip press to a level higher than the predetermined higher pressure level, operate the display component to display a scanning icon in place of the aiming icon on the touch screen display.

The initial icon may include a transparent icon; and at least one of the aiming icon and the scanning icon may include a non-transparent icon.

The processor may be further configured to, in response to the detection of the commencement of the digit tip press, and in response to the digit tip press commencing with a pressure greater than the predetermined lower pressure level and less than the predetermined higher pressure level, perform operations including: monitor the at least one tactile component to detect movement of the tip of the digit, still in contact with and across the touch screen display, away from the aiming icon; and in response to the detection of the movement of the tip of the digit, still in contract with and across the touch screen display, away from the aiming icon, operate the display component to move the aiming icon with the tip of the digit.

The processor may be further configured to, after the attempt to scan the encoded data marking, perform operations including: operate the aiming component to cease projecting the visual guide; and operate the at least one tactile component to cease providing the haptic indication of the attempt to scan of the encoded data marking.

The processor may be further configured to, in response to the detection of the commencement of the digit tip press, in response to the digit tip press commencing with a pressure greater than the predetermined lower pressure level and less than the predetermined higher pressure level, and in response to a lack of detection of the increase in the pressure of the digit tip press to a level higher than the predetermined higher pressure level throughout a predetermined timeout period of time following the detection of the commencement of the digit tip press, operate the aiming component to cease projecting the visual guide.

The processor may be further configured to, in response to the detection of the commencement of the digit tip press, and in response to the digit tip press commencing with a pressure greater than the predetermined higher pressure level, perform operations including: operate the aiming component to project the visual guide; operate the scanning component to again attempt to scan the encoded data marking within the FOV; and operate the at least one tactile component to provide, to the digit, the haptic indication of again attempting to scan the encoded data marking.

A method includes: operating, by a processor of a decoding device, a display component of a touch screen display of the decoding device to display an initial icon on the touch screen display; and monitoring, by the processor, at least one tactile component of the touch screen display to detect a commencement of pressing of a tip of a digit of a hand on the touch screen display at the initial icon. The method also includes, in response to the detection of the commencement of the digit tip press, and in response to the digit tip press commencing with a pressure greater than a predetermined lower pressure level and less than a predetermined higher pressure level, performing operations including: operating, by the processor, an aiming component of a scanning engine of the decoding device to project a visual guide to assist in aiming the scanning engine at an encoded data marking on a surface of an object; monitoring, by the processor, the at least one tactile component to detect an increase in the pressure of the digit tip press to a level higher than the predetermined higher pressure level; and in response to the detection of the increase in the pressure of the digit tip press to a level higher than the predetermined higher pressure level, operating, by the processor, a scanning component of the scanning engine to attempt to scan the encoded data marking within a field of view (FOV) of the scanning engine, and operating, by the processor, the at least one tactile component to provide, to the tip of the digit, a haptic indication of the attempt to scan the encoded data marking.

The attempt to scan the encoded data marking may include an attempt to capture the encoded data marking and an attempt to decode the encoded data marking; and the haptic indication of the attempt to scan the encoded data marking may include a selection from among two different tactile sensations based on whether the attempt to capture the encoded data marking and the attempt to decode the encoded data marking were both successful.

The haptic indication of the attempt to scan the encoded data marking may include a simulation of a tactile sensation of fully depressing a mechanical button.

The method may further include: in response to the detection of the commencement of the digit tip press, and in response to the digit tip press commencing with a pressure greater than the predetermined lower pressure level and less than the predetermined higher pressure level, operating, by the processor, the at least one tactile component to provide, to the tip of the digit, a haptic indication of detection of the digit tip press; and in response to the detection of the increase in the pressure of the digit tip press to a level higher than the predetermined higher pressure level, operating, by the processor, the at least one tactile component to cease providing the haptic indication of detection of the digit tip press to enable the provision of the haptic indication of the attempt to scan the encoded data marking.

The method may further include: in response to the detection of the commencement of the digit tip press, and in response to the digit tip press commencing with a pressure greater than the predetermined lower pressure level and less than the predetermined higher pressure level, operating, by the processor, the display component to display an aiming icon in place of the initial icon on the touch screen display; and in response to the detection of the increase in the pressure of the digit tip press to a level higher than the predetermined higher pressure level, operating, by the processor, the display component to display a scanning icon in place of the aiming icon on the touch screen display.

The initial icon may include a transparent icon; and at least one of the aiming icon and the scanning icon may include a non-transparent icon.

The method may further include, in response to the detection of the commencement of the digit tip press, and in response to the digit tip press commencing with a pressure greater than the predetermined lower pressure level and less than the predetermined higher pressure level, performing operations including: monitoring, by the processor, the at least one tactile component to detect movement of the tip of the digit, still in contact with and across the touch screen display, away from the aiming icon; and in response to the detection of the movement of the tip of the digit, still in contract with and across the touch screen display, away from the aiming icon, operating, by the processor, the display component to move the aiming icon with the tip of the digit.

The method may further include, after the attempt to scan the encoded data marking, performing operations including: operating, by the processor, the aiming component to cease projecting the visual guide; and operating, by the processor, the at least one tactile component to cease providing the haptic indication of the attempt to scan the encoded data marking.

The method may further include, in response to the detection of the commencement of the digit tip press, in response to the digit tip press commencing with a pressure greater than the predetermined lower pressure level and less than the predetermined higher pressure level, and in response to a lack of detection of the increase in the pressure of the digit tip press to a level higher than the predetermined higher pressure level throughout a predetermined timeout period of time following the detection of the commencement of the digit tip press, operating, by the processor, the aiming component to cease projecting the visual guide.

The method may further include, in response to the detection of the commencement of the digit tip press, and in response to the digit tip press commencing with a pressure greater than the predetermined higher pressure level, performing operations including: operating, by the processor, the aiming component to project the visual guide; operating, by the processor, the scanning component to again attempt to scan the encoded data marking within the FOV; and operating, by the processor, the at least one tactile component to provide, to the digit, a haptic indication of again attempting to scan the encoded data marking.

The invention claimed is:

1. A method comprising:
   operating, by a processor of a decoding device, a scanning engine to capture an image of an object with an encoded data marking within a field of view (FOV) of the scanning engine;
   operating, by a processor of a decoding device, a display component of a touch screen display of the decoding device to display an initial icon on the touch screen display;
   monitoring, by the processor, at least one tactile component of the touch screen display to detect a commencement of pressing of a tip of a digit of a hand on the touch screen display at the initial icon; and
   in response to the detection of the commencement of the digit tip press, and in response to the digit tip press commencing with a pressure greater than a predetermined lower pressure level and less than a predetermined higher pressure level, performing predetermined operations and operating the at least one tactile component of the touch screen to provide haptic feedback indicative of the performed predetermined operations.

2. The method of claim 1, wherein the haptic feedback is indicative of a result of an attempted decode of the encoded data marking.

3. The method of claim 2, wherein the haptic feedback includes a first type of haptic feedback for a successful decode of the encoded data marking, and a second type of haptic feedback for an unsuccessful decode of the encoded data marking.

4. The method of claim 2, wherein the haptic feedback includes a first type of haptic feedback indicating the digit tip press initiating a decoding attempt, and either a second type of haptic feedback indicating a successful decoding attempt or a third type of haptic feedback indicating an unsuccessful decoding attempt.

5. The method of claim 4, wherein the third type of haptic feedback indicating an unsuccessful decoding attempt is a cessation of the first type of haptic feedback indicating the digit tip press.

6. The method of claim 4, wherein operating the at least one tactile component of the touch screen to provide haptic feedback includes mechanically moving a transparent component that overlies a display component of the touch screen.

7. The method of claim 4, wherein operating the at least one tactile component of the touch screen to provide haptic feedback includes mechanically moving a display component of the touch screen.

8. The method of claim 4, wherein operating the at least one tactile component of the touch screen to provide haptic feedback includes exerting a vibratory mechanical force against a casing of the decoding device that is mechanically transmitted to a surface of the touch screen.

9. The method of claim 1, wherein performing predetermined operations includes initiating an aiming mode.

10. The method of claim 1, wherein performing predetermined operations includes initiating a scanning mode.

11. A decoding device comprising:
a scanning engine comprising a scanning component configured to scan an encoded data marking within a field of view (FOV) of the scanning engine;
a touch screen display comprising a display component configured to visually present visual indications, and one or more tactile components configured to accept touch input and to provide haptic indications; and
a processor communicatively coupled to the touch screen display and the scanning engine, the processor configured to perform operations comprising:
operate the display component to display an icon on the touch screen display;
monitor the one or more tactile components to detect a pressing force on the touch screen display at the initial icon; and
in response to the detection of the pressing having a pressure greater than a predetermined lower pressure level performing predetermined operations and operating the one or more tactile components of the touch screen to provide haptic feedback indicative of the performed predetermined operations.

12. The decoding device of claim 11, wherein the one or more tactile components include separate tactile components for performing detection of the pressing force and for providing the haptic feedback.

13. The decoding device of claim 12, wherein the tactile components for performing detection of the pressing force include at least one of a piezo or a magnetic transducer configured to detect a manual input.

14. The decoding device of claim 13, wherein the tactile components for providing haptic feedback include at least one of linear resonant actuator, a rotary motor coupled to a worm drive, or an actuator having a shape memory material.

15. The decoding device of claim 11, wherein the one or more tactile components include tactile components configured to perform both detection of the pressing force and providing the haptic feedback.

16. The decoding device of claim 11, wherein the haptic feedback includes a simulation of a tactile sensation of fully depressing a mechanical button.

17. The decoding device of claim 11, wherein the haptic feedback includes a varying vibration sensation.

18. The decoding device of claim 11, wherein the predetermined operations include one of an aiming mode or a scanning mode of the decoding device.

19. The decoding device of claim 11, wherein the haptic feedback is indicative of either an unsuccessful decode or a successful decode of the encoded data marking during a scanning mode.

20. The decoding device of claim 11, wherein the haptic feedback is indicative of a transition between an aiming mode and a scanning mode of the decoding device.

* * * * *